May 5, 1970  J. P. LUNDBERG  3,509,922
THREE-BLADE SHEAR MECHANISM FOR CUTTING TREE-LENGTH
LOGS INTO BOLTS
Filed May 8, 1968  2 Sheets-Sheet 1

INVENTOR.
JOHN P. LUNDBERG
BY
Dugger, Peterson, Johnson & Westman
Attorneys

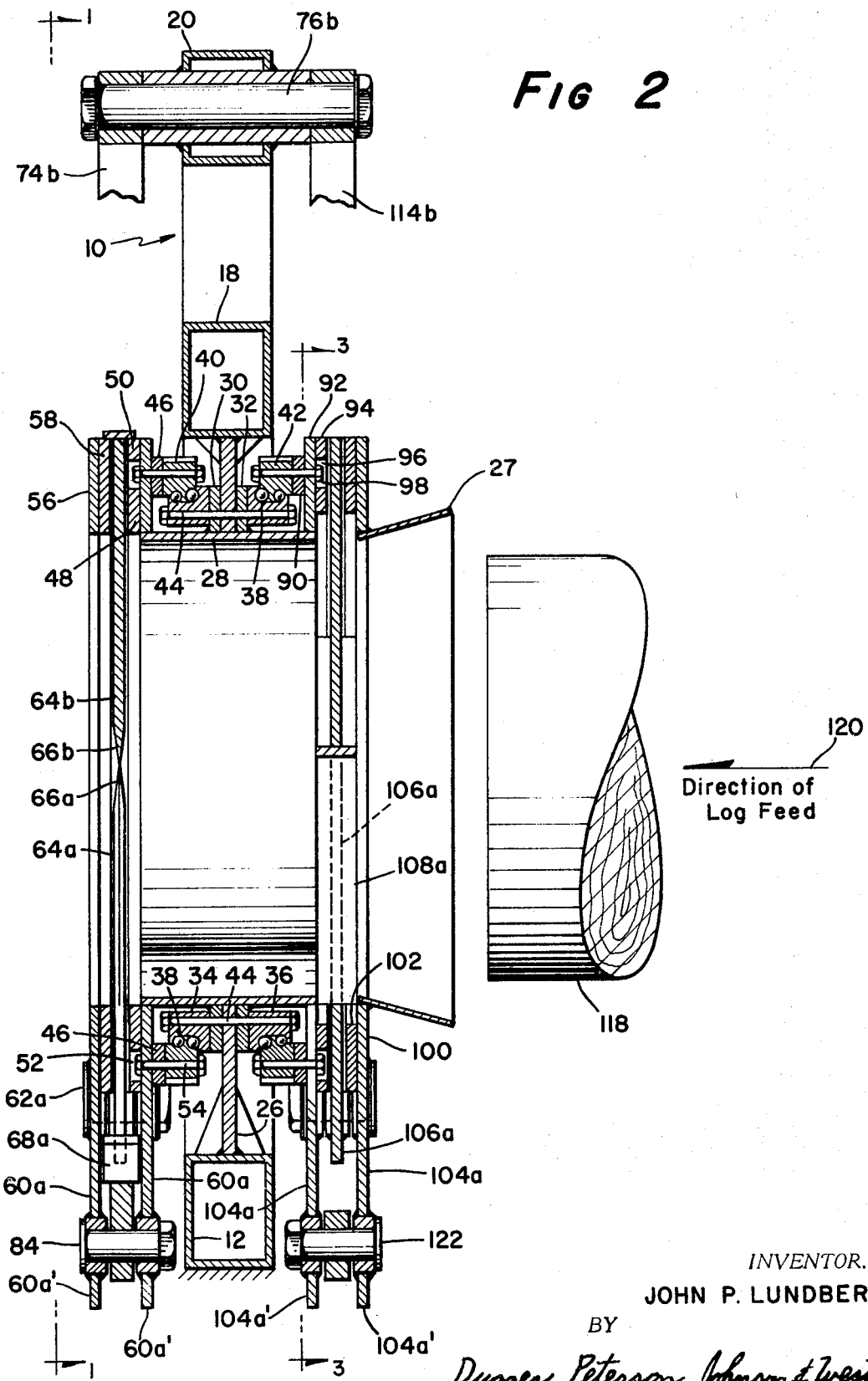

3,509,922
THREE-BLADE SHEAR MECHANISM FOR CUTTING TREE-LENGTH LOGS INTO BOLTS
John P. Lundberg, Washburn, Wis., assignor to Beloit Corporation, Beloit, Wis., a corporation of Wisconsin
Filed May 8, 1968, Ser. No. 728,382
Int. Cl. B27b 29/00
U.S. Cl. 144—34                 10 Claims

ABSTRACT OF THE DISCLOSURE

Three sector-shaped blades are provided with cooperable knife edges. The blades are mounted for pivotal movement in a vertical plane, one corner of each blade being pivotally attached to a twist ring member at angularly spaced locations of 120° from each other. The other corners of the blades are pivotally connected to elongated guide members so that when the ring member is oscillated or rotated in one direction, the blades are simultaneously forced inwardly toward each other to sever the bolt from a tree-length log and when the ring member is oscillated or rotated in an opposite direction, the blades are swung outwardly away from each other. A holding device comprised of sector-shaped clamping jaws is similarly constructed, the jaws being actuated inwardly in unison to whatever extent is necessary to hold the tree during the shearing operation performed by the trio of blades.

CROSS REFERENCE TO RELATED APPLICATION

This invention will find special utility in connection with the apparatus depicted in a copending application titled "Mobile Tree Processor," Ser. No. 727,431, filed on even date and assigned to the same assignee as the instant application.

BACKGROUND OF THE INVENTION

Field of the invention

This invention relates generally to the processing of tree-length logs, and pertains more particularly to a shear mechanism for cutting the tree-length logs into shorter sticks or bolts.

Description of the prior art

Slashers, of course, have been used rather extensively throughout the years for cutting tree-length logs into bolts. However, slashers have usually utilized a chain saw which is mounted for swinging movement about a horizontal axis. Chain saws, however, are relatively slow acting. Also, they require a mechanism for swinging the saw through an arcuate path when it is performing its sawing operation. Still further, power must be provided of a rotative nature so as to cause the chain to be constantly moved.

Attempts have been made to use shear blades, usually one such blade being mounted for pivotal movement in cooperation with a second such blade. While these blades are basically satisfactory, they do possess certain shortcomings as far as their cutting action is concerned. For instance, as the blade enters the wool, axial shear forces are set up in the fiber which forces become more acute as penetration increases due to fiber displacement by the blade. The shear forces that are generated become critical in dry or frozen wood, tending to split the tree in a plane perpendicular to that of the blade (where a single blade cuts against an anvil) or blades (where a two-bladed shear has its blades arranged in either a coplanar or bypassing relationship). Also, the mounting of such blades, particularly the way in which they are actuated, is somewhat complex.

SUMMARY OF THE INVENTION

An important object of the present invention is to minimize the likelihood of splitting due to the fibrous nature of the wood, as has occurred previously. More specifically, the invention utilizes a trio of blades mounted in a single plane so that the actual penetration of each blade into the wood is reduced, the blades meeting centrally within the wood. In other words, the travel is shared by three blades rather than one or two, and the axial shear forces are likewise more evenly dispersed. The tendency for a shear mechanism to split wood has in the past been the largest single detriment to its use. Furthermore, since the cutting is progressively inward from three directions, actually directions that are 120° from each other, the reactive forces are absorbed by the blades themselves. The actuation of the blades has been simplified also, because only one ram is required. Additionally, the shear mechanism forming the subject matter of the present invention lends itself readily to use with a holding device or mechanism having a similar basic construction and operation.

BRIEF DESCRIPTION OF THE DRAWINGS

FIG. 2 is a sectional view taken generally in the direction of line 2—2 of FIG. 1.

DESCRIPTION OF THE PREFERRED EMBODIMENT

Figure 1:
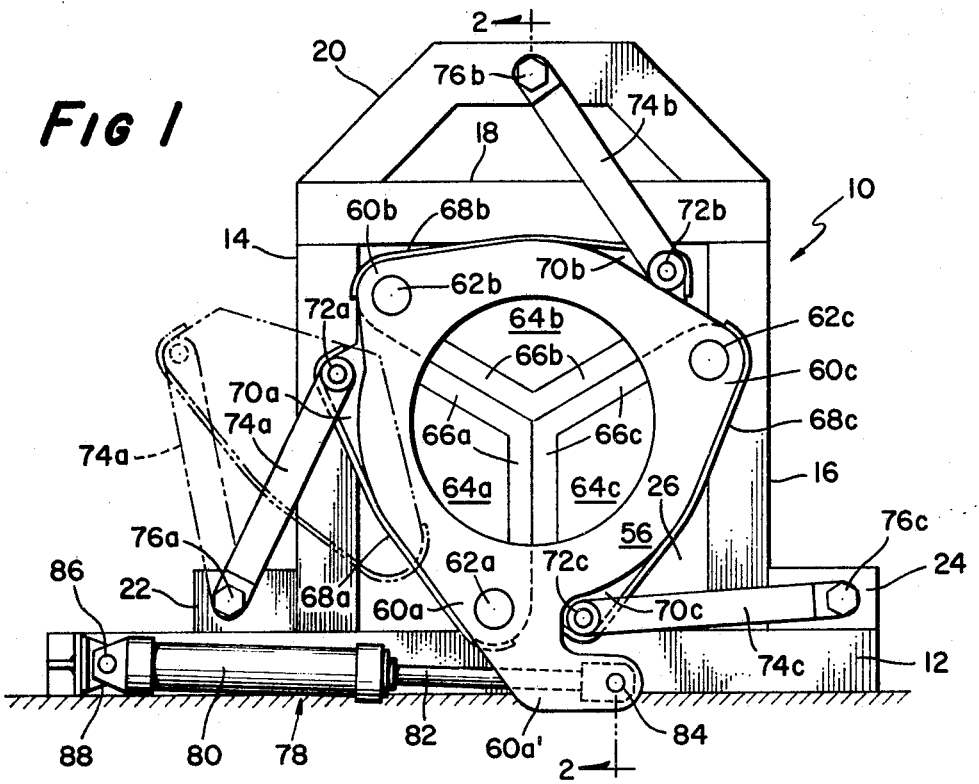
FIG. 1 is an elevational view in the direction fo line 1—1 of FIG. 2.

Referring now in detail to the drawings, a frame unit designated generally by the reference numeral 10 has been illustrated. The frame unit 10 comprises a horizontal lower member 12 which is fixedly attached at its lower side to a sub-structure, such as the chassis of a vehicle (not shown). A typical use of the invention has been illustrated in the co-application for "Mobile Tree Processor" hereinbefore identified. The frame unit 10 further includes a pair of vertical side members 14, 16. The horizontal upper member 18 is fixedly attached to the upper ends of the upright members 14, 16. Surmounting the horizontal upper member 18 and integral therewith is a bridging member 20. Still further, the frame unit 10 includes flanking or foot members 22 and 24 for a special purpose hereinafter explained.

As best viewed in FIG. 2, the lower edge of a square plate 26 is welded to the horizontal member 12, and the upper edge of this plate is similarly welded to the underside of the upper member 18. Likewise, the side edges are welded to the side members 14 and 16. The square plate 26 having a flared entranceway 27 is formed with a circular hole for the accommodation of a cylindrical metal shell or sleeve 28 that not only serves as a passage through which a tree-length log is advanced, but its outer periphery functions as a radial thrust or anticocking bearing in two instances hereinafter made manifest. Circumferentially welded to the shell 28 and also to opposite sides of the square plate 26 are circular mounting flanges 30, 32.

Inner races of two bearings, the races being labeled 34 and 36, are detachably held against the circular mounting flanges 30 and 32. The bearings of which the races 34 and 36 are a part have a plurality of balls 38 and circumjacent the inner races or outer races 40 and 42 which are rotatably mounted by means of said balls 38 in each of said bearing situations. The inner bearing races 34 and 36, as mentioned above, are detachably connected to the flanges 30, 32; the manner in which the attachment is effected is through the agency of a relatively large number of mounting bolts 44, the large number allowing relatively small diameter bolts to be employed.

The description now to be presented will deal specifically with the shear portion of the mechanism that successively severs or cuts bolts from the tree-length log. Accordingly, a spacer ring 46 confronts one side of the outer race 40. The spacer ring 46 serves as a spacer for positioning an inner twist disc or ring 48 to which can be integrally secured a reinforcing ring 50. The reinforcing ring 50 contains a number of angularly spaced holes 52 and a similar number of mounting bolts 54 have their heads disposed within said holes and extend through the twist disc or ring 48, the spacer ring 46 and the outer race 40, as clearly evident from FIG. 2. An outer twist disc or ring 56 has an identical contour or outline as the inner twist ring 48 and has a reinforcing ring 58 corresponding to the ring 50.

As best seen in FIG. 1, the outer twist ring 56 is formed with angularly spaced ears 60a, 60b, and 60c. Inasmuch as plate 56 is identical to plate 48, the inner plate 48 also has correspondingly spaced ears. However, since the ears 60a serve as the connecting means to a motor hereinafter referred to, they are formed with angled extensions labeled 60a'; both of the extensions 60a' appear in FIG. 2, it might be explained.

Extending through the various ears 60a, 60b, and 60c on both twist rings 48 and 56 are pivot pins designated by the numerals 62a, 62b and 62c. These pins 62, in effect, make the twist rings 48 and 56 integral with each other.

Sector-shaped blades 64a, 64b and 64c are mounted for pivotal movement on the various pins 62a, 62b and 62c. The blades 64 are each formed with knife edges along their radii, the knife edges being identified as 66a, 66b and 66c. As readily understandable from FIG. 1, these knife edges form 120° angles and when the blades 64 are completely together as shown in this figure, then the knife edges are contiguous. It should be understood, though, that the various blades 64a, 64b and 64c, owing to their mounting on the pins 62a, 62b and 62c, are pivotal in a common plane so that the knife edges 66a, 66b and 66c actually meet as should be easily appreciated. Each blade has a reinforcing rib or flange welded to its outer edge, the flanges having been assigned the numerals 68a, 68b and 68c respectively. At this time, attention is directed to ears 70a, 70b and 70c on the various blades 64. A swing pin 72a extends through the ear 70a, a swing pin 72b through the ear 70b and a swing pin 72c through the ear 70c.

Although it will be clearer as the description progresses, a trio of elongated guide members 74a, 74b and 74c have their corresponding ends pivotally connected to the swing pins 72a, 72b and 72c, respectively. The other ends of the elongated guide members 74 are connected through the agency of anchor pins 76a, 76b and 76c disposed on fixed axes. More specifically, the anchor pin 76a is mounted on the foot 22, the pin 76b is mounted on the bridging member 20, and the anchor pin 76c on the foot 24.

Reference has already been made to the extensions 60a', these extensions serving as arms by which the discs or rings 48 and 56 can be rotated. The motor for performing the rotative operation constitutes a hydraulic ram 78 having a cylinder 80 and a piston rod 82 extending from said cylinder. A pin 84 connects the free end of the piston rod 82 to the extension from 60a' as clearly shown in FIGS. 1 and 2. The closed end of the cylinder 80, however, is connected by a pin 86 to a mounting unit 88 that can be integral with the frame unit 10.

Consideration will now be given to a holding device or mechanism that is constructed along the same lines as the shear mechanism just referred to. The resemblance will be readily seen, it is believed. For instance, a spacer ring 90 is positioned between the outer race 42 and a twist disc or ring 92, the twist ring 92 corresponding in function to the plate 48 and having a reinforcing ring 94 secured thereto. The reinforcing ring 94 is formed with a series of angularly spaced holes 96 which accommodate the heads of an equal number of mounting bolts 98. A second or outer twist ring 100 corresponds to the plate 56 and in the illustrated situation has a reinforcing ring 102 attached thereto. The twist ring 100, as can be determined from FIG. 3, has angularly spaced ears 104a, 104b and 104c integral therewith. The inner twist ring 92 is similarly formed with such ears and pins 105a, 105b, 105c extend therethrough, thus corresponding to the pins 62a, 62b, 62c, respectively. The ears 104a on each of the discs or rings 92 and 100 have extensions 104a' thereon as can be discerned from FIG. 2.

Sector-shaped clamping jaws 106a, 106b and 106c are provided with gripping flanges 108a, 108b and 108c, respectively. Ears 110a, 110b and 110c are formed on the three sector-shaped jaws 106. Swing pins 112a, 112b and 112c extend through the ears 110 and pivotally connect with corresponding ends of elongated guide members 114a, 114b and 114c. The same anchor pins 76a, 76b and 76c used to pivotally support about fixed axes the previously mentioned guide members 74a, 74b and 74c can be utilized in this instance, the pins simply being long enough as can be seen in the upper portion of FIG. 2 where the pin 76b appears.

A hydraulic ram 116 comprising a cylinder 118 and having an extensible piston rod 120 serves as the motor means for the two twist rings 92 and 100, being connected through the extensions 104a' by means of a pin 122. The closed end of the cylinder 118 can be pivotally connected to the same pin 86 that the cylinder 80 is pivotally connected to, thereby utilizing the same mounting unit 88.

It will be appreciated that the inner twist rings 48 and 92 are formed with holes or openings therein only slightly larger in diameter than the outside diameter of the sleeve or shell 28. Consequently, such an arrangement cooperates with the ball bearings composed of the races 34, 40 in one instance and 32, 42 in the other to prevent binding or cocking. Normally, though, there will not be enough force that would be imposed on the blades 64 or the clamping jaws 106 that would cause the twist ring 48 or the twist ring 92 to rub against the cylindrical shell 28, but it is important to recognize that any excessive loads can be adequately accommodated for the gauge stock that is used for fabricating the frame 10 and particularly the plate 26.

Figure 3:
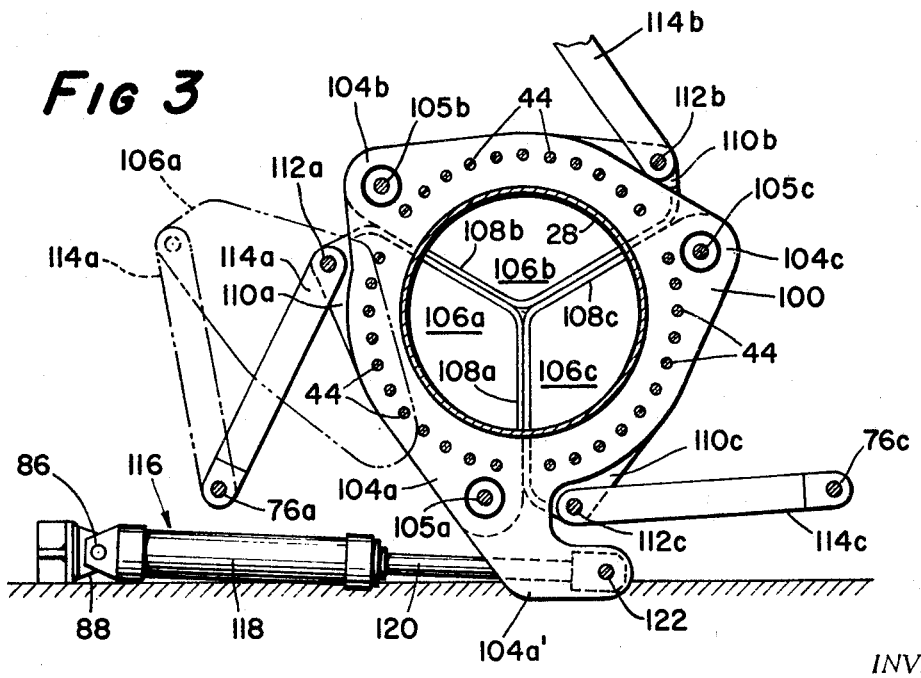
FIG. 3 is a sectional view taken in the direction of line 3—3 of FIG. 2.

Having presented the foregoing description, the manner in which the shear and holding mechanisms function should be readily understood. However, a brief description of their operation should be of assistance in appreciating the benefits to be derived from the practicing of my invention. Accordingly, a tree-length log 118 has been fragmentarily depicted in FIG. 2 and is advanced or fed in the direction of the arrow 120. As illustrated in FIGS. 2 and 3, though, the clamping jaws 106a, 106b and 106c are fully closed, this being the condition that is never really needed in actual practice but serves as a convenient expedient for describing the holding mechanism or device.

The jaws 106 will be retracted or separated in order to allow the left end of the log 118 to be introduced against the right sides of the blades 64a, 64b and 64c, the particular size mentioned for the blades 64a and 64b appearing in FIG. 2. The alluded to sides would be the sides or faces of these blades away from the viewer when looking at the shear mechanism as it appears in FIG. 1.

Before presenting the operational description of the holding mechanism or device, it will be well to explain how the shear mechanism functions. As indicated above, the log 118, that is the butt end thereof, is advanced against the blades 64a, 64b, 64c when closed or in the position depicted in FIGS. 1 and 2. The blades 64 are then retracted or separated so as to allow a predetermined length of the log 118 to be further advanced, this being the amount corresponding to the length of the bolt that is desired. In other words, the blades 64 when closed serve as the initial means for the subsequent indexing of the log 118 to give the desired bolt length.

To open the blades 64a, 64b, 64c in order to allow the requisite portion of the log 118 to be fed through the sleeve or shell 28, the ram 78 is operated so as to retract its piston rod 82. Although the hoses leading to the cylinder 80 are not shown, it will be appreciated that hydraulic fluid under pressure is introduced into the right end of the cylinder 80 so as to effect the retraction or withdrawal of the piston rod 82. This causes the twist discs or rings 48 and 56 to be rotated in a clockwise direction as viewed in FIG. 1. It will be remembered that pins 62a, 62b and 62c extend between the two twist rings 48, 56 and in this way the rings are moved in unison. Since the inner ring 48 is connected directly to the outer race 40, the outer race 40 rotates about the inner race 34, the inner race being fixedly attached to the square plate 26 and the mounting flange 30.

Due to the connection of the various guide members 74a, 74b and 74c to the ears 70a, 70b and 70c on the blades 64a, 64b and 64c, it will be recognized that the guide members 74 are swung outwardly, the phantom line position of the member 74a serving to illustrate the action that occurs as far as the blade 64a is concerned; the movement of the blades 64b and 64c is of course the same.

With the blades 64a, 64b and 64c separated or in their open condition, the log 118 can be advanced from its abutting position where it had been moved against the blades sufficiently to the left as viewed in FIG. 2 so as to position it for cutting. It is when the log 118 is so positioned that the sector-shaped clamping jaws 106a, 106b and 106c are actuated thereagainst to hold the log in a fixed relationship during the ensuing severing action. It will be appreciated, as can be fully understood from the aforementioned copending application, that the right end of the tree-length log receives support from a traveling carriage or clamping device, but since such device plays no part as far as the instant invention is concerned, there is no need for showing such a device.

At any rate, when the log 118 has been properly positioned, the clamping jaws 106a, 106b, 106c are actuated inwardly by introducing fluid under pressure into the left or closed end of the cylinder 80 of the ram 78. As viewed in FIG. 3, the clamping jaws 106 are fully together, but it will be recognized that this condition would not need to take place in actual practice. Since we are for the moment assuming that the jaws are retracted or separated, the projection of the piston rod 120 outwardly from the cylinder 118 results in the jaws moving inwardly toward each other. More specifically, this causes the extensions 104a' (both of these extensions appearing in FIG. 2) to be moved to the right as viewed in FIG. 3. The jaw 106a has been illustrated in phantom outline in its open or separated relationship. It will be understood that the actuation of the extensions 104a' will result in the twist rings 92 and 100 being rotated in a counterclockwise direction which causes the jaws to pivot about their respective pins 105a, 105b and 105c. Of course, due to the presence of the elongated guide members 114a, 114b and 114c, the corners opposite the corners through which the pins 105a, 105b, and 105c pass, will be moved inwardly due to the fact that the elongated members are connected by the swing pins 112a, 112b and 112c to these opposite corners. As already stated, the jaws 106 will not be moved so far as to reach the condition depicted in FIG. 3, because they will quickly engage at three spaced points circumferential portions of the log 118 that has been properly positioned by equipment (not shown) for shearing by the blades 64.

From the preceding description, it should be obvious that actuation of the clamping jaws 106a, 106b and 106c is very similar to the actuation of the blades 64a, 64b and 64c. In both instances, the blades 64 and the jaws are pivotally mounted and elongated guide members are utilized so that the blades and jaws are swung inwardly and outwardly depending upon the direction in which their respective twist rings are rotated. More specifically, the opening or closing of either the blades or jaws will be determined by whether the piston rods of the rams 78 and 116 are extended or retracted relative to their respective cylinders.

Thus, after the log 118 has been clamped, then the piston rod 82 of the cylinder 80 which belongs to the ram 78 is projected outwardly from the cylinder 80 so as to rotate the twist rings 48 and 56 in a counterclockwise direction so as to cause the blades 64a, 64b and 64c to pivot inwardly toward each other and quickly reach the contiguous condition shown in FIG. 1. At this stage, the bolt will have been completely severed from the remainder of the log 118. The foregoing operation is repeated in successive steps until the entire log 118 has been cut into bolts of desired length.

I claim:

1. A shear mechanism for severing successive bolts from a tree-length log comprising a trio of blades, means mounting said blades at angularly spaced locations for pivotal movement in substantially the same plane, said blades having cooperable knife edges, and means for forcibly pivoting said blades toward each other to sever a bolt from a tree-length log.

2. A shear mechanism in accordance with claim 1 in which each of said blades is sector-shaped and said knife edges extend along the radii of each blade member.

3. A shear mechanism in accordance with claim 2 in which the radii of each blade are disposed at an angle of 120° with respect to each other.

4. A shear mechanism in accordance with claim 3 in which said pivotal locations are spaced at 120° with respect to each other and are in general radial alignment with corresponding knife edges of said blades so that the knife edges of one blade meet adjacent edges on the other blades when said blades are moved sufficiently toward each other.

5. A shear mechanism in accordance with claim 4 in which said mounting means includes a rotatable ring member, said blades being pivotally attached to said ring member.

6. A shear mechanism in accordance with claim 5 including a frame for rotatably mounting said ring member.

7. A shear mechanism in accordance with claim 6 including an elongated guide member for each blade, one end of each of said guide members being pivotally connected to its particular blade and the other end of each guide member being pivotally connected to said frame.

8. A shear mechanism in accordance with claim 7 including motor means for rotating said ring member in one direction to cause said blades to pivotally move toward each other and in opposite rotative direction to retract said blades.

9. A shear mechanism in accordance with claim 8 including means for holding the tree-length log while said blades are moved toward each other to sever a bolt from said log.

10. A shear mechanism in accordance with claim 9 in which said holding means includes a trio of sector-shaped jaw members, a second ring member rotatably supported on said frame, said jaw members being pivotally attached to said second ring member, elongated guide members pivotally connected to said jaw members and to said frame, and second motor means for rotating said second ring member in one direction to cause said jaw members to pivotally move toward each other to grip the tree-length log and in an opposite rotative direction to retract said jaw members and thereby release said tree-length log.

References Cited

UNITED STATES PATENTS 3,398,774   8/1968   Hahn _____ 144—309

FOREIGN PATENTS 5,784   1908   Great Britain.

GERALD A. DOST, Primary Examiner

U.C. Cl. X.R.

144—3